United States Patent Office 3,649,607
Patented Mar. 14, 1972

3,649,607
PROCESS FOR MANUFACTURING BUTADIENE-ISOPRENE COPOLYMER
Junji Furukawa, Takeo Saegusa, and Akira Onishi, Kyoto, and Takao Ishikawa, Shiro Anzai, Koichi Irako, Tsuneaki Narumiya, and Yuzo Ishizuka, Tokyo, Japan, assignors to Bridgestone Tire Company Limited, Tokyo, Japan
No Drawing. Continuation-in-part of application Ser. No. 480,159, Aug. 16, 1965. This application May 6, 1969, Ser. No. 822,326
Claims priority, application Japan, July 13, 1965, 40/41,759; July 22, 1965, 40/44,027, 40/44,029
Int. Cl. C08d 1/12, 3/08, 3/12
U.S. Cl. 260—82.1                              11 Claims

ABSTRACT OF THE DISCLOSURE

Butadiene-isoprene copolymer having a butadiene unit of at least 90% of cis-1,4-structure and an isoprene unit of at least 95% of 1,4-structure is produced by copolymerizing butadiene and isoprene by means of three component catalyst consisting of (A) a compound selected from the group consisting of an organic carboxylic acid salt and an organic complex compound of nickel, (B) a compound selected from the group consisting of boron trifluoride and its complex compound with an oxygen-containing organic compound and (C) an organometallic compound selected from the group consisting of trialkylaluminum, dialkylzinc, alkyllithium and dialkylalkoxyaluminum, butadiene/isoprene feed ratio being in the range of 90/10–70/30 (mole ratio), the mole ratio of said (C)-component to said (A)-component being at least 0.5 and the mole ratio of said (C)-component to said (B)-component being within the range of 0.5 to 2.0.

---

This application is a continuation-in-part of our copending application Ser. No. 480,159, filed Aug. 16, 1965, now abandoned.

The present invention relates to a process for manufacturing butadiene-isoprene copolymer, more particularly, a process for manufacturing butadiene-isoprene copolymer having a butadiene unit of at least 90% of cis-1,4-structure and an isoprene unit of at least 95% of 1,4-structure by copolymerizing butadiene and isoprene by means of three component catalyst consisting of (A) a compound selected from the group consisting of an organic carboxylic acid salt and an organic complex compound of nickel, (B) a compound selected from the group consisting of boron trifluoride and its complex compound with an oxygen-containing organic compound and (C) an organometallic compound selected from the group consisting of trialkylaluminum, dialkylzinc, alkyllithium and dialkylalkoxyaluminum.

Heretofore, a large number of processes have been disclosed in technical literature and patents with respect to the homopolymerization of conjugated dienes, such as butadiene, isoprene and the like.

It has been found that in the synthetic rubber field, copolymerization of monomers can provide rubbers having improved physical properties than the homopolymers of each monomer, for example, at present, copolymers, such as emulsion type styrene-butadiene rubber, alfin rubber, styrene-butadiene rubber obtained by means of lithium catalyst and the like are the most generally used of the synthetic rubbers.

Accordingly, efforts for developing more excellent copolymers have been continued.

Furthermore, it has been found that stereospecific polymers, such as, cis-1,4-polybutadiene show much better physical properties than the polymers having random microstructure, but copolymerization using butadiene as a component by means of the catalyst for such stereospecific polymers has been unsuccessful hitherto. There are only several patents, in which it is merely described that copolymerization may be effected even by the catalyst for homopolymerization of butadiene.

In such copolymerization with butadiene as one of the monomers, the polymerization activity is much lower, the molecular weight of the product is substantially decreased in comparison with that of the homopolymers and the reaction is accompanied by considerable gelation, with unsatisfactory microstructure. Consequently with known procedures satisfactory copolymers with butadiene cannot be obtained.

It is significant that in such procedures the catalysts were such as were capable of producing homopolymers of the monomers separately. In some instances with a monomer mixture the reaction is substantially inhibited with little or no polymerization of one or more of the monomers and in others only a mixture of the homopolymers is produced.

For example, Japanese Pat. No. 481,901 has disclosed that if in the copolymerization of butadiene with styrene, titanium tetraiodide-triethylaluminum is used as a catalyst, styrene acts as only solvent and cannot form a copolymer.

In any case, it has been considered that only when monomers, each of which can effect homopolymerization, are combined, the copolymerization of the monomers can be carried out. When a monomer which can be homopolymerized by a certain catalyst and a monomer which cannot be homopolymerized by said catalyst are combined, the copolymerization of these monomers has never succeeded heretofore by means of the catalyst. Only one exception is a complex polymerization as in an alternate copolymerization of styrene with maleic anhydride by means of a free radical catalyst.

The inventors have found a process for manufacturing butadiene-isoprene copolymer having a novel structure which has never been known heretofore, wherein the butadiene unit has a high cis-1,4-structure and the isoprene unit has a high 1,4-structure, by means of the above described three component catalyst consisting of the components A, B and C.

The inventors have already succeeded in manufacture of high cis-1,4-polybutadiene by using the same three component catalyst as in the present invention, as described in U.S. Pats. Nos. 3,170,907 and 3,170,905.

However, as shown in the following comparative examples, the inventors have attempted to homopolymerize isoprene by using the same three component catalyst under such conditions that butadiene can be homopolymerized, but the polymerization activity is very low and the homopolymer cannot be substantially obtained.

Accordingly, it has never been considered from the usual conception that a copolymerization of isoprene is effected by using the three component catalyst.

The inventors have investigated the function of isoprene as a solvent or as a regulator for molecular weight in the homopolymerization of butadine and found that butadiene-isoprene copolymer can be obtained under special conditions. More surprising, stereospecific copolymerization with high activity occurs under these conditions.

Furthermore, the catalyst system using a compound of cobalt which is the same transition metal of VIII Group in the Periodic Table as nickel can homopolymerize isoprene, but if butadiene and isoprene are polymerized by using such a catalyst, for example, cobaltnaphthenate-borontrifluoride etherate-triethylaluminum or cobaltous chloride ethylalcohol complex-diethylaluminumchlorideethylaluminumdichloride (disclosed in U.S. Pat. No. 3,068,180 by Van Amerongen et al.), the resulting copolymer has only about 70% of cis-1,4-structure in the butadiene unit and the copolymerization cannot provide the copolymer of the present invention having a butadiene unit of at least 90% of cis-1,4-structure and an isoprene unit of at least 95% of 1,4-structure.

Namely, this fact shows that nickel catalyst of the present invention is different in the characteristic from the cobalt catalyst.

Furthermore, as shown in the following example, if the reactivity ratio of monomers in the copolymerization of butadiene and isoprene by means of the catalyst of this invention is calculated, r(butadiene) is 0.85±0.16 and r(isoprene) is 0.63±0.17 and it has been seen that the reactivities of both the monomers are substantially same. Considering that isoprene cannot be substantially homopolymerized as mentioned above, it can be seen that the homopolymerization is very different in mechanism from the copolymerization.

The present invention is accomplished only under limited conditions, namely at a limited feed ratio of monomers and at a limited molar ratio of the catalytic components. The copolymers obtained under the other conditions have little value. Namely, when the feed ratio of butadiene/isoprene is 90/10 to 70/30 in molar ratio, the copolymer having high molecular weight and no gel can be obtained in a high yield. Of course, even in the feed ratio of isoprene lower or higher than the above described ratio, the copolymer can be obtained, but if the ratio is lower than the above described ratio, the resulting copolymer is not substantially different from homopolybutadiene, while if the ratio is higher than the above described ratio, the activity and the molecular weight lower.

When copolymerization is effected at the above described feed ratio of the monomers, the copolymer having a butadiene content of 70 to 95 mol percent can be obtained.

The invention will be further explained in detail hereinafter.

The catalyst to be used in the invention is three component catalyst consisting of the components A, B and C.

The (A)-component of the catalyst includes nickel salt of an organic carboxylic acid and organic complex compound of nickel. The nickel salt of an organic carboxylic acid has the following formula

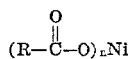

wherein R is a radical selected from the group consisting of aliphatic hydrocarbon containing up to 17 carbon atoms, alicyclic hydrocarbon and aromatic hydrocarbon containing up to two rings and $n$ is the valence of nickel.

These salts are, for example, nickel 2-ethylhexoate, nickel isooctenate, nickel palmitate, nickel stearate, nickel benzoate, nickel methylbenzoate, nickel cyclohexylcarboxylate and nickel naphthenate.

The organic complex compound of nickel is a carbonyl complex such as tetracarbonyl nickel, a hydroxyaldehyde complex such as salicylaldehyde nickel, salicylaldoxime nickel or salicylaldehydeimine nickel, a hydroxyketone complex such as acetylacetone nickel, a hydroxyacid complex such as salicylic acid nickel, a hydroxyester metal complex such as acetacetic ethylester nickel, a 8-hydroxyquinoline complex, such as 8-hydroxyquinoline nickel, a diketonedioximo metal complex such as bis(dimethylglyoximo)nickel or a cyclodiolefin complex such as 1,5-cyclooctadiene nickel.

It is preferred to use nickel naphthenate, nickel 2-ethylhexoate, nickel isooctenate, nickel palmitate, nickel stearate, nickel benzoate, acetylacetone nickel, acetacetic ethylester nickel, salicylaldehyde nickel, or salicylaldehydeimine nickel.

The (B)-component of the catalyst system includes boron trifluoride and its complex compound with an oxygen-containing organic compound. The oxygen-containing organic compound is, for example, an alcohol compound such as butyl alcohol, a phenol compound such as phenol, an organic acid compound such as acetic acid, an ether compound such as ethyl ether, butyl ether or anisole, or an ester compound such as methyl acetate or ethyl acetate.

Examples of the (B)-component are boron trifluoride, boron trifluoride ethyletherate, boron trifluoride butyletherate, boron trifluoride-acetic acid complex, boron trifluoride ethylacetate complex, boron trifluoride butylalcoholate and boron trifluoride phenolate. Boron trifluoride and boron trifluoride etherate such as boron trifluoride ethyletherate are preferable among them.

The (C)-component of the catalyst system includes trialkylaluminum, dialkylalkoxyaluminum, dialkylzinc and alkyllithium such as triethylaluminum, tributylaluminum, triisobutylaluminum, trihexylaluminum, diethylethoxyaluminum, diethylzinc and butyllithium. It is preferable to employ triethylaluminum or triisobutylaluminum.

These components (A), (B) and (C) of the catalyst have the same indispensable functions for the present cis-1,4-butadiene copolymerization as those for the cis-1,4-butadiene homopolymerization described in U.S. Pats. Nos. 3,170,907 and 3,170,905.

By selecting each component from the above list of preferred embodiments and combining them, preferable these component catalysts can be obtained, for example, nickel naphthenate-boron trifluoride etherate-triethylaluminum or triisobutylaluminum, nickel 2-ethylhexoate-boron trifluoride etherate-triethylaluminum or triisobutylaluminum, nickel stearate-boron trifluoride etherate-triethylaluminum or triisobutylaluminum, nickel palmitate-boron trifluoride etherate-triethylaluminum or triisobutylaluminum, nickel benzoate-boron trifluoride etherate-triethylaluminum or triisobutylaluminum, nickel isooctenate-boron trifluoride etherate-triethylaluminum or triisobutylaluminum, nickel naphthenate-boron trifluoride-triethylaluminum or triisobutylaluminum, tetracarbonyl nickel-boron trifluoride etherate-triethylaluminum or triisobutylaluminum, acetylacetone nickel-boron trifluoride-triethylaluminum or triisobutylaluminum, acetylacetone nickel-boron trifluoride etherate-triethylaluminum or triisobutylaluminum, acetacetic ethylester nickel-boron trifluoride etherate-triethylaluminum or triisobutylaluminum, salicylaldehyde nickel-boron trifluoride etherate-triethylaluminum or triisobutylaluminum and salicylaldehyde nickel-boron trifluoride etherate-triethylaluminum or triisobutylaluminum.

When the catalysts are prepared through mixing the (A)-, (B)- and (C)-components under an inert atmosphere and in the presence of an inert organic solvent, the copolymerization is influenced by the mole ratio, the mixing temperature and kinds of solvent. Among these factors, the mole ratio is an important factor. The mole ratio of the (C)-component to the (B)-component is usually within the range of about 0.5 to about 2.0, more preferably within the range of about 0.7 to about 1.5. The mole ratio of the (C)-component to the (A)-component is usually at least 0.5 and, when the (A)-component is the salt of organic acid and said organic complex of nickel, the preferable ranges of said ratios of the salt and the complex are 0.5 to 50 and 0.5 to 1,000 respectively.

The catalyst system is prepared by admixing said three components in the presence of an anhydrous solvent at a temperature between about −50° C. and about 80° C., preferably between about −5° C. and about 40° C.

The amount of the catalyst used is not especially critical in the invention, but it is usually within the range of about $10^{-1}$ to about $10^{-4}$ mole per 1.0 mole of monomer.

The solvents are aromatic hydrocarbons such as benzene, toluene and a xylene, aliphatic hydrocarbons such as butane, pentane, hexane, heptane and octane, alicyclic hydrocarbons such as cyclohexane and decaline, diisopropylether and mixture thereof.

The copolymerization is directly affected by the relative amounts of isoprene and butadiene. The molar ratio of butadiene/isoprene to be fed in the polymerization system of the invention ranges from 90/10 to 70/30. If the amount of isoprene exceeds the above ratio, the polymerization activity decreases and the molecular weight of the resulting copolymer lowers.

The following examples show that homopolymerization of isoprene does not substantially occur, but that in the above described feed ratio of isoprene, isoprene can be copolymerized in an amount near the feed ratio.

The copolymerization is carried out contacting butadiene and isoprene with said catalyst system at a temperature within the range of about $-30°$ C. to about $150°$ C., preferably about $0°$ C. to about $80°$ C., in the presence of a solvent, under a pressure sufficient to maintain the reaction system in the liquid phase and under an inenrt atmosphere.

Both the random and two-stepwise copolymerization processes can be used for the preparation of conjugated diolefin copolymers according to the invention. The random process is carried out by charging a mixture of butadiene and said hydrocarbon-radical-substituted butadiene to the catalyst system. In the two-stepwise process, the polymerization of butadiene is carried out, after which isoprene is charged to the polymerization zone.

After the copolymerization, the copolymer is precipitated by adding a large quantity of non-solvent such as methyl alcohol and isopropyl alcohol containing a small percentage of phenyl-$\beta$-naphthylamine to the reaction mixture. Then the copolymer is separated by means of a siphon, a filter or a centrifuge and dried under a reduced pressure.

The intrisinc viscosities were measured in toluene solution at $30°$ C. Microstructures of the butadiene unit, microstructures of the isoprene unit and contents of isoprene in the butadiene-isoprene copolymer were measured according to the infrared spectroscopic analysis by Morero's method {La Chimica e L'Industri, 41, 758 (1959)}, Richardson's method {J. Polymer Sci., 10, 353 (1953)} and Furukawa's method {Kogyokagaku Zasshi, 65, 2075 (1962)} respectively.

The invention will be more fully described with reference to the following examples.

EXAMPLE 1

A given amount of nickel naphthenate (used as 0.01 g./ml. solution in benzene) and a given amount of boron trifluoride etherate (used as 0.5 mol/lit. solution in benzene) were introduced to a 360 ml. glass pressure bottle which had been purged with dry nitrogen and charged with a given amount of purified benzene or n-hexane.

The bottle was kept at room temperature for ten minutes, and then a given amount of triethylaluminum was added thereto.

After standing for ten minutes, the catalyst system thus obtained was cooled to $-20°$ C. and the mixture of a given amount of 1,3-butadiene and a given amount of isoprene was introduced therein. Said given amounts of each substance are shown in the following Table 1. The bottle was tightly sealed and agitated by revolution in a thermostat at $40°$ C.

After the completion of the reaction, the resulting polymer was precipitated in methanol containing a small amount of phenyl-$\beta$-naphthylamine, then dissolved again in benzene and reprecipitated in methanol.

The polymer obtained was dried in a vacuum oven, weighed, determined its intrinsic viscosity in toluene at $30°$ C. and analyzed by infrared spectrum.

The results thus obtained are shown in Table 1.

TABLE 1

| Exp. No. | Butadiene, mol. | Isoprene, mol. | Ni-naphthenate, g. | $BF_3.Et_2O$, mmol. | $AlEt_3$, mmol. | Solvent (ml.) | Poly'n time, hr. | Yield, percent | $[\eta]$ | Isoprene cont., percent | Butadiene part, percent | | | Isoprene 1,4, percent |
|---|---|---|---|---|---|---|---|---|---|---|---|---|---|---|
| | | | | | | | | | | | Cis-1,4 | Trans-1,4 | 1,2 | |
| 1-1 | 0.337 | 0.038 | 0.12 | 1.4 | 1.25 | Benzene (50) | 3.0 | 92.1 | 1.42 | 9.5 | | | | |
| 1-2 | 0.337 | 0.038 | 0.12 | 1.4 | 1.25 | Hexane (50) | 3.0 | 56.4 | 1.86 | 8.3 | | | | |
| 1-3 | 0.75 | 0.084 | 0.072 | 0.86 | 0.76 | Hexane (100) | 8.0 | 41.2 | 2.58 | 6.5 | 97.0 | 2.3 | 0.7 | 100 |
| 1-4 | 0.75 | 0.188 | 0.072 | 0.80 | 0.70 | do | 6.0 | 73.6 | 2.45 | 7.9 | 96.9 | 2.1 | 1.0 | 100 |
| 1-5 | 0.375 | 0.161 | 0.072 | 0.80 | 0.70 | Hexane (50) | 6.0 | 69.4 | 1.68 | 10.2 | 96.9 | 2.3 | 0.8 | 100 |

Note.—Poly'n: Polymerization; Cont.: Content.

Comparative Example 1

By using 45 ml. of n-hexane, 0.0931 mmol. of cobalt naphthenate, 1,034 mmol. of boron trifluoride etherate and 0.931 mmol. of triethylaluminum, a catalyst was prepared and then 0.145 mol. of butadiene and 0.037 mol. of isoprene were fed thereto and the polymerization was carried out at $40°$ C. for 6 hours in the same manner as described in Example 1. The yield of the resulting polymer was 47.3%. The intrinsic viscosity $[\eta]$ was 3.08 and the isoprene content was 17.2 mol. percent, while cis-1,4-structure of butadiene unit was 71.5% and 1,4-structure of isoprene unit was 89.6%.

Comparative Example 2

According to the method of Van Amerongen et al., (U.S. Pat. No. 3,068,180), by using 0.0142 mmol. of cobaltous chloride-ethyl alcohol complex, 0.90 mmol. of diethylaluminum chloride, 0.60 mmol. of ethylaluminum dichloride and 188 ml. of benzene, a catalyst was prepared and 0.5 mol. of butadiene and 0.2 mol. of isoprene were fed thereto and the polymerization was carried out at $20°$ C. for 20 hours. The yield of the resulting polymer was 24.0%. The polymer had an intrinsic viscosity of 1.53, a gel content of 1.2% and an isoprene content of 30.5 mol. percent. The cis-1,4-structure, trans-1,4-structure and vinyl structure of butadiene unit were 78.8%, 4.0% and 17.1%, respectively and 1,4-structure of isoprene unit was 93%.

EXAMPLE 2

A given amount of purified anhydrous n-hexane was charged in a 100 ml. glass pressure bottle which had been previously purged with dry nitrogen.

Then, acetylacetone nickel (used as 0.1 mol./lit. solution in toluene) and boron trifluoride etherate (used as 0.5 mol./lit. solution in toluene) were introduced into the bottle under nitrogen atmosphere. After standing for ten minutes at $25°$ C., a given amount of triethylaluminum (used as 0.5 mol./lit. solution in n-hexane) was added. The catalyst system was aged at $25°$ C. for ten minutes.

The methods of copolymerization and recovery of the polymer were similar to those described in Example 1. The results thus obtained are shown in Table 2.

TABLE 2

| Exp. No. | Catalyst system | | | Polymer | | | | | |
|---|---|---|---|---|---|---|---|---|---|
| | Ni(AcAc)₂, mmol. | Mol. ratio | | Yield, g. | Gel, percent | [η] | C₅ cont., mol. percent | C₄ cis-1,4, percent | C₅ 1,4, percent |
| | | Al/Ni | Al/B | | | | | | |
| 2-1 | 0.063 | 6.5 | 0.2 | 3.1 | 0 | 0.41 | | | |
| 2-2 | 0.063 | 6.5 | 0.5 | 3.5 | 0 | 1.24 | 14.2 | 93.5 | 100 |
| 2-3 | 0.063 | 6.5 | 0.9 | 4.1 | 0 | 1.96 | 14.3 | 94.2 | 100 |
| 2-4 | 0.063 | 6.5 | 1.4 | 1.7 | 0 | 2.07 | 13.2 | 93.8 | 100 |
| 2-5 | 0.063 | 10.5 | 0.2 | 2.8 | 0 | 0.345 | | | |
| 2-6 | 0.063 | 10.5 | 0.5 | 4.0 | 0 | 0.96 | 16.0 | 92.3 | 100 |
| 2-7 | 0.063 | 10.5 | 0.9 | 5.3 | 0 | 1.40 | 16.0 | 92.7 | 100 |
| 2-8 | 0.063 | 10.5 | 1.4 | 3.0 | 0 | 1.46 | 15.0 | 92.8 | 100 |

The common conditions are as follows:

Butadiene: 7.5 ml.
Isoprene: 2.5 ml.
Butadiene/Isoprene (mol. ratio)=8/2
Solvent/total monomer (vol. ratio): 4/1
Polymerization condition: 40° C.×6.0 hrs. (round)
$C_4$: butadiene unit
$C_5$: isoprene unit
Al: triethylaluminum
B: boron trifluoride etherate
Ni(AcAc)₂: acetylacetone nickel

EXAMPLE 3

The copolymerization of butadiene and isoprene in this example was carried out by using n-hexane or toluene as solvent. The preparation of catalyst and copolymerization were effected in similar manner to that described in Example 2, except using a given quantity each of nickel 2-ethylhexoate (Ni-EH) (used as 0.1 mol./lit. solution in the corresponding solvent to that used in the polymerization zone), boron trifluoride etherate (used as 0.5 mol./ lit. solution in toluene) and triethylaluminum (used as 0.5 mol./lit. solution in the corresponding solvent to that used in the polymerization zone).

The results thus obtained are shown in Table 3.

and then the fractionation was effected to obtain the following result.

| | Weight (percent) | Isoprene content (mol. percent) | [η] |
|---|---|---|---|
| High molecular weight range | 70 | 10.0 | 3.70 |
| Low molecular weight range | 30 | 16.1 | 0.51 |

Thus, it can be seen that the product obtained in this example is a true copolymer.

Furthermore, 100 parts of the product obtained in this example were added with 45 parts of ISAF (Intermediate Super Abrasion Furnace), 6 parts of pine tar, 1.5 parts of sulfur and 1.0 part (in total) of an accelerator to obtain a composition (ML–4: 45.0) and then the resulting composition was vulcanized at 145° C. for 30 minutes. The thus vulcanized product had a hardness of 50°, an elongation of 630%, a tensile strength of 137 kg./cm.², a 300% modulus after 15 minutes of 22 kg./cm.², an abrasion loss at 25% of 25 cm.³/min., a cut growth of 16.8, a resilience of 58.0 and a flex crack of 10. Particularly, this product had an excellent processability and was favorably blended with natural rubber and the like.

TABLE 3

| Exp. No. | Catalyst system | | | Monomer | | | | Poly'n time, hr. | Polymer | | | | |
|---|---|---|---|---|---|---|---|---|---|---|---|---|---|
| | Ni-EH, mmol. | Mol. ratio | | Ml. | | | Solvent (S/M) | | Yield, (g.) | [η] | C₅ cont., mol. percent | C₄ cis-1,4, percent | C₅ 1,4, percent |
| | | Al/Ni | Al/B | C₄ | C₅ | C₄/C₅ | | | | | | | |
| 3-1g | 0.096 | 7.75 | 1.1 | 13.07 | 1.93 | 9/1 | n-Hexane (3) | 7.0 | 8.33 | 2.50 | | | |
| 3-2g | 0.144 | 6.5 | 0.9 | 17.42 | 2.58 | 9/1 | Toluene (2) | 7.0 | 13.86 | 1.43 | 11.2 | 92.9 | 97.7 |
| 3-3g | 0.166 | 7.75 | 1.1 | 15.02 | 4.98 | 8/2 | Toluene (2) | 6.0 | 7.41 | 1.66 | 14.0 | 92.0 | 95.6 |

Note.—Polymerization temperature: 40° C. (round); S/M: Solvent/total monomer (vol. ratio).

EXAMPLE 4

A stainless steel autoclave of 100 l. capacity was dried and purged with nitrogen, and thereto were fed 38.73 kg. of purified and dried n-hexane, a solution of 22.2 mmol. of nickel naphthenate in toluene, and 166.5 mmol. of boron trifluoride etherate. Then the resulting mixture was stirred at room temperature for about 10 minutes, and thereto was added 190.3 mmol. of triethylaluminum, and thereafter the mixture was stirred at room temperature for 10 minutes.

Then the whole reaction system was cooled to −10° C., and 8.11 kg. (150 mol.) of butadiene and 1.13 kg. (16.67 mol.) of isoprene were introduced therein, and then polymerization was conducted at 40° C. for 28 hours while stirring.

The yield of the resulting product was 96.9% and the isoprene content was 12.5 mol percent. Further the intrinsic viscosity was 3.04 and the microstructure of butadiene unit had cis-1,4-structure of 94.8%, trans-1,4-structure of 2.96% and vinyl structure of 2.19%. In addition, the microstructure of isoprene unit had 1,4-structure of about 100%.

A part of the resulting product was dissolved in toluene, and to the resulting solution was added dropwise acetone,

EXAMPLE 5

The polymerization was carried out at 40° C. for 6.5 hours in the same manner as described in Example 1 except using 0.156 mmol. of nickel acetacetic ethylester as (A)-component, 2.78 mmol. of boron trifluoride etherate, and 2.5 mmol. of triethylaluminum and feeding 0.249 mol. of butadiene and 0.0623 mol. of isoprene. In this case, n-hexane was used in an amount of two times of the total volume of butadiene and isoprene. The rubbery elastomer was obtained with a yield of 53.5% and had no gel. The intrinsic viscosity was 3.57. From an infrared analysis, the isoprene content was 15.7 mol. percent, and the microstructure of butadiene unit had cis-1,4-structure of 91.2%, trans-1,4-structure of 5.3% and vinyl structure of 3.4%, while cis-1,4-structure of isoprene unit was 95.7% and the remainder was 3,4-structure.

Comparative Example 3

The polymerization was carried out according to the same recipe as described in Example 5 except using 0.333 mol. of butadiene alone as a monomer. The yield of the polymer obtained was 94.9% and cis-1,4-structure was 95.5%. In addition, the polymerization was conducted according to the same recipe under the same condition except using 0.25 mol. of isoprene alone as a monomer. The product insoluble in methanol was not obtained at all.

EXAMPLE 6

The polymerization was carried out at 40° C. by using 0.25 mmol. of nickel acetylacetonate, 2.15 mmol. of boron trifluoride etherate and 1.88 mmol. of triethylaluminum except that the total amount of monomers was 0.25 mol. and a mole ratio of butadiene to isoprene was varied. In this case, n-hexane was used as a solvent and a volume ratio of total monomers to solvent was 1:4.

The result thus obtained is shown below.

| (Monomer) Butadiene/ isoprene (mole ratio) | (Polymer) Isoprene in polymer (mol. percent) | Yield (percent) |
|---|---|---|
| 9/1 | 10 | 9.8 |
| 8/2 | 19.5 | 7.5 |
| 7/3 | 27 | 6.3 |
| 3/7 | 63 | 0.4 |

The ratio of the reactivity of monomers was calculated from the above data to obtain r(butadiene)=0.85±0.16 and r(isoprene)=0.63±0.17. Thus, it can be seen that isoprene can not be substantially homopolymerized as shown in comparative example, but in the copolymerization of isoprene with butadiene, isoprene shows the reactivity, which competes with the polymerizability of butadiene.

EXAMPLE 7

Copolymerization of butadiene and isoprene was conducted according to the same method as described in Example 2 except using 0.1 mol./lit. solution of acetacetic ethylester nickel in toluene instead of acetylacetone nickel.

The results thus obtained are shown in Table 4.

EXAMPLE 8

Catalysts were prepared in the same method as described in Example 2 by using 0.1 mol./lit. solution of acetylacetone nickel in toluene. A given quantity of butadiene was introduced into the bottle and the polymerization was conducted at 40° C. for several hours. Then, the bottle was cooled in water bath and a given quantity of isoprene was fed therein. After continuously revolving at 40° C. for six hours, the resulting polymer was recovered from the reaction mixture in the same way as that described in Example 1.

The results thus obtained are shown in Table 5.

TABLE 5

| Exp. No. | Butadiene polymerization time, hr. | Polymer | | | | |
|---|---|---|---|---|---|---|
| | | Yield, g. | $[\eta]$ | $C_5$ cont., mol. percent | $C_4$ cis-1,4, percent | $C_5$ 1,4, percent |
| 8-1 | 0 | 6.9 | 1.58 | 14.0 | 92.8 | 100 |
| 8-2 | 0.5 | 6.8 | 3.80 | 6.7 | 95.6 | 100 |
| 8-3 | 1.0 | 7.1 | 3.58 | 4.8 | 95.9 | 100 |

The common conditions are as follows:

Butadiene: 10 ml.
Isoprene: 3.35 ml.
Solvent/monomer (vol. ratio): 4/1
Ni(AcAc)$_2$: 0.838 mmol.
Al/Ni (mol. ratio): 6.5.
Al/B (mol. ratio): 0.9.

EXAMPLE 9

A dried 100 ml. glass pressure bottle was purged with dry nitrogen and charged with 48 ml. of purified benzene, 2.0 mmol. of tetracarbonyl nickel, 2.0 mmol. of boron trifluoride etherate and 2.0 mmol. of triethylaluminum. Each ingredient was used as 0.5 mol./lit. solution in benzene. The catalyst system thus obtained was aged at 25° C. for one hour.

TABLE 4

| Exp. No. | Catalyst system (mol. ratio) | | Poly'n time, hr. | Polymer | | | | | |
|---|---|---|---|---|---|---|---|---|---|
| | Al/Ni | Al/B | | Yield, g. | Gel., percent | $[\eta]$ | $C_5$ cont., mol. percent | $C_4$ cis-1, 4, percent | $C_5$ 1,4, percent |
| 7-1 | 6.5 | 0.9 | 6.0 | 1.72 | 0 | 2.31 | 13.3 | 92.7 | 96.1 |
| 7-2 | 6.5 | 1.4 | 6.0 | 4.34 | 0 | 2.54 | 12.7 | 93.7 | 96.4 |
| 7-3 | 10.5 | 1.4 | 6.0 | 9.47 | 0 | ------ | 15.7 | 91.2 | 95.7 |

Ni(AAEE)$_2$: acetacetic ethylester nickel.

The common conditions are as follows:

Ni(AAEE)$_2$: 0.156 mmol.
Butadiene: 18.77 ml.
Isoprene: 6.23 ml.
Butadiene/isoprene=8/2 (mol. ratio)
Solvent/monomer (vol. ratio):2/1
Polymerization temperature: 40° C. (round)

Then, the bottle containing catalyst components was cooled in ice bath or Dry Ice-methanol bath, charged with 0.125 mol. of liquefied butadiene and kept at 40° C. for a given time while revolving.

Then, 0.125 mol. of isoprene was introduced into the reaction mixture and the mass was copolymerized at 40° C. for a given time. The polymer was recovered in the same way as in Example 1.

The results thus obtained are shown in Table 6.

TABLE 6

| Exp. No. | Polymerization time, min. | | Polymer | | | |
|---|---|---|---|---|---|---|
| | Butadiene | Isoprene | Yield, g. | C₅ cont., mol. percent | C₄ cis-1,4, percent | C₅ 1,4, percent |
| 9-1 | 80 | 280 | 7.5 | 8 | 94.7 | 95 |
| 9-2 | 180 | 180 | 7.5 | 9 | 94.1 | 95 |

EXAMPLE 10

Butadiene and isoprene were copolymerized in n-hexane or toluene while revolving according to the similar method to that described in Example 2 except that some modifications were employed as shown in the following. The (A)-component was salicylaldehyde nickel, nickel benzoate or nickel stearate, and the (C)-component was triethylaluminum (used as 0.5 mol./lit. solution in the corresponding solvent to that used in the polymerization zone).

Especially in Examples 10–1 to 10–4, the mixing of the three catalyst components was carried out while stirring on a magnetic stirrer.

The results thus obtained are shown in Table 7.

ture within the range of −30° C. to 150° C. under a pressure sufficient to maintain the reaction system in the liquid phase, and under an inert atmosphere, the mole ratio of butadiene/isoprene feed being in the range of 90/10–70/30 and said catalyst having three components consisting of (A) a compound selected from the group consisting of a nickel salt of an organic carboxylic acid of the formula

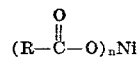

(wherein R is a radical selected from the group consisting of aliphatic hydrocarbon containing up to 17 carbon atoms, alicyclic hydrocarbon and aromatic hydrocarbon containing up to two rings and $n$ is the valence of nickel),

TABLE 7

| Exp. No. | Catalyst system | | | | Monomer (ml.) | | Solvent | S/M | Polymerization time, hr. | Polymer | | | | |
|---|---|---|---|---|---|---|---|---|---|---|---|---|---|---|
| | (A)-component, g. | Mol. ratio | | | | | | | | Yield, g. | [η] | C₅ cont., mol. percent | C₄ cis-1,4, percent | C₅ 1,4, percent |
| | | Al/Ni | Al/B | C₄H₆ | C₅H₈ | | | | | | | | | |
| 10-1 | Ni(Sal)₂ (0.1006) | 6.5 | 0.9 | 21.8 | 3.2 | n-Hexane | 2 | 2.5 | 15.1 | 2.36 | 4.77 | 95.2 | 96.1 |
| 10-2 | Ni-benzoate (0.0969) | 6.75 | 0.9 | 21.8 | 3.2 | do | 2 | 2.6 | 14.3 | 2.42 | 8.8 | 94.9 | 96.9 |
| 10-3 | do | 6.75 | 0.9 | 21.8 | 3.2 | Toluene | 2 | 5.5 | 17.9 | 1.28 | 9.8 | 93.2 | 96.8 |
| 10-4 | Ni-stearate (0.06) | 6.5 | 0.9 | 15.0 | 5.0 | n-Hexane | 2.5 | 6.0 | 2.8 | 2.23 | 8.2 | 95.2 | 96.5 |

Note.—Ni(Sal)₂: salicylaldehyde nickel; polymerization temperature: 40° C. (round).

EXAMPLE 11

Butadiene and isoprene were copolymerized in n-pentane or n-hexane while revolving according to the similar method to that described in Example 2 except that some modifications were employed as shown in the following. The (A)-component was acetylacetone nickel (used as solid state or 0.1 mol./lit. solution in toluene) or nickel naphthenate (used as 0.1 mol./lit. solution in n-hexane) and the (C)-component was n-butyllithium (used as 1.48 mol./lit. solution in n-hexane), diethylzinc (used as 1.0 mol./lit. solution in toluene) or diethylmonoethoxyaluminum (used as 0.5 mol./lit. solution in toluene). The results thus obtained are shown in Table 8.

a hydroxy-ketone nickel complex, a hydroxyester nickel complex, a hydroxyaldehyde nickel complex, a 8-hydroxyquinoline nickel complex, a hydroxy acid nickel complex, a diketonedioximo nickel complex, a cyclodiolefin nickel complex and a carbonyl nickel complex, (B) a compound selected from the group consisting of boron trifluoride and its complex with an oxygen-containing organic compound and (C) an organometallic compound selected from the group consisting of alkyllithium, dialkylzinc, trialkylaluminum and dialkylalkoxyaluminum, the mole ratio of said (C)-component to said (A)-component being at least 0.5 and the mole ratio of said (C)-component to said (B)-component being within the range of 0.5 to 2.0.

TABLE 8

| Exp. No. | Catalyst system | | | Monomer ml. | | Solvent | Poly,n time hr.* | Polymer | | | | |
|---|---|---|---|---|---|---|---|---|---|---|---|---|
| | (A)-component | (C)-component (mmol.) | C/B (mol. ratio) | C₄H₆ | C₅H₈ | | | Yield, g. | [η] | C₅ cont., mol. percent | C₄ cis-1,4, percent | C₅ 1,4 percent |
| 11-1 | Ni(AcAc)₂ (0.0167 g.) | nBuLi (0.968) | 1.0 | 8.71 | 1.29 | n-pentane | 23 | 1.0 | 1.04 | 8.0 | 93.2 | 100 |
| 11-2 | Ni-naphthenate (0.0645 mmol.) | ZnEt₂ (0.387) | 0.5 | 8.71 | 1.29 | n-Hexane | 23 | 6.8 | 0.71 | 8.4 | 93.0 | 100 |
| 11-3 | Ni(AcAc)₂ (0.0645 mmol.) | AlEt₂(OET) (0.387) | 1.0 | 8.71 | 1.29 | do | 21 | 6.1 | 2.55 | 6.0 | 92.2 | 100 |

*The polymerization systems were left to stand still for 13 hours after revolving.

Note.—The common conditions are as follows: Solvent/monomer (vol. ratio): 4/1. Polymerization temperature: 40° C.

What is claimed is:

1. A process for manufacturing butadiene-isoprene copolymer having a butadiene unit of at least 90% of cis-1,4-structure and an isoprene unit of at least 95% of 1,4-structure, which comprises copolymerizing butadiene and isoprene by contacting the two monomers with a catalyst, in the presence of a solvent selected from the group consisting of aromatic, aliphatic and alicyclic hydrocarbons, diisopropyl ether and their mixtures at a tempera- 2. A process according to claim 1, wherein said nickel salt of organic carboxylic acid is a compound selected from the group consisting of nickel naphthenate, nickel 2-ethylhexoate, nickel isooctenate, nickel palmitate, nickel stearate and nickel benzoate.

3. A process according to claim 1, wherein said hydroxyketone metal complex is acetylacetone nickel.

4. A process according to claim 1, wherein said hydroxyester metal complex is acetacetic ethylester nickel.

5. A process according to claim 1, wherein said hydroxyaldehyde metal complex is a compound selected from the group consisting of salicylaldehyde nickel and salicylaldehydeimine nickel.

6. A process according to claim 1, wherein said boron trifluoride complex is boron trifluoride etherate.

7. A process according to claim 1, wherein said alkyllithium is butyllithium.

8. A process according to claim 1, wherein said dialkylzinc is diethylzinc.

9. A process according to claim 1, wherein said trialkylaluminum is a compound selected from the group consisting of triethylaluminum and triisobutylaluminum.

10. A process according to claim 1, wherein said dialkylalkoxyaluminum is diethylethoxyaluminum.

11. A process according to claim 1, wherein said solvent is selected from the group consisting of benzene, toluene, a xylene, pentane, hexane, heptane, isopropylether and mixtures thereof.

References Cited

UNITED STATES PATENTS

| | | | |
|---|---|---|---|
| 3,068,180 | 12/1962 | Van Amerongen | 252—429 |
| 3,070,587 | 12/1962 | Zelinski | 260—94.3 |
| 3,165,503 | 1/1965 | Kahn et al. | 260—94.3 |
| 3,170,905 | 2/1965 | Veda et al. | 260—94.3 |
| 3,170,907 | 2/1965 | Veda et al. | 260—94.3 |
| 3,215,682 | 11/1965 | Farrar et al. | 260—94.3 |
| 3,432,516 | 3/1969 | Marconi et al. | 260—94.3 |

ALLAN LIEBERMAN, Primary Examiner

U.S. Cl. X.R.

252—429